(12) United States Patent
Takagi (10) Patent No.: US 7,114,598 B2
(45) Date of Patent: Oct. 3, 2006

(54) BRAKE COOLING MECHANISM OF FOUR-WHEELED VEHICLE

(75) Inventor: Izumi Takagi, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 74 days.

(21) Appl. No.: 10/648,279

(22) Filed: Aug. 27, 2003

(65) Prior Publication Data

US 2004/0040776 A1 Mar. 4, 2004

(30) Foreign Application Priority Data

Aug. 28, 2002 (JP) ............................ P2002-248848

(51) Int. Cl.
*F16D 55/02* (2006.01)

(52) U.S. Cl. ............... 188/71.6; 188/264 R; 188/264 E (58) Field of Classification Search ................ 180/344, 180/233, 244, 245, 246, 370; 475/222; 188/71.6, 188/264 A, 264 R, 264 E, 264 B, 18 A, 71.5; 74/411.5; 184/6.12; 192/70.12
See application file for complete search history.

(56) References Cited

U.S. PATENT DOCUMENTS

| | | | | |
|---|---|---|---|---|
| 4,022,298 | A * | 5/1977 | Malinowski | 188/71.6 |
| 4,140,198 | A * | 2/1979 | Chamberlain | 180/370 |
| 4,179,016 | A * | 12/1979 | Alderman et al. | 192/221 |
| 6,315,091 | B1 * | 11/2001 | Nilsen et al. | 188/264 A |
| 6,401,857 | B1 * | 6/2002 | Hisada et al. | 180/344 |
| 6,805,217 | B1 * | 10/2004 | Kinouchi et al. | 180/233 |
| 2002/0112905 | A1 * | 8/2002 | Kitai et al. | 180/68.1 |
| 2004/0040776 | A1 * | 3/2004 | Takagi | 180/370 |

FOREIGN PATENT DOCUMENTS

| | | |
|---|---|---|
| JP | 59-18659 | 2/1984 |
| JP | 59-130791 | 7/1984 |
| JP | 60-015244 | 1/1985 |
| JP | 61-012458 | 1/1986 |
| JP | 11-029013 | 2/1999 |
| JP | 2000-272315 | 10/2000 |

* cited by examiner

Primary Examiner—Christopher P. Schwartz
(74) Attorney, Agent, or Firm—Wenderoth, Lind & Ponack, L.L.P.

(57) ABSTRACT

A brake cooling system for a four-wheeled drive automobile effectively releases frictional heat generated in a braking apparatus from a surface of a casing of the braking apparatus, and has enough height of a body of the automobile relative to ground level. The brake cooling system includes an air discharging duct which is connected to an air discharging outlet of a belt cover covering an automatic V-belt transmission. The duct extends to a vicinity of the braking apparatus so as to supply air towards the braking apparatus. The braking apparatus is positioned in front of a final reduction gear for rear wheels, and the casing of the braking apparatus is a common casing inside of which the braking apparatus and the final reduction gear are accommodated.

5 Claims, 5 Drawing Sheets

BRAKE COOLING MECHANISM OF FOUR-WHEELED VEHICLE

BACKGROUND OF THE INVENTION

1. Field of the Invention

The present invention generally relates to a brake cooling mechanism for a four-wheeled vehicle, and particularly relates to the brake cooling mechanism which is suitable for a straddle type all-terrain four-wheeled drive vehicle.

2. Description of the Related Art

As a straddle type all-terrain four-wheeled drive vehicle, Japanese Laid-Open Patent Publication No. 2000-272315 discloses a vehicle in which a brake casing is integrated with a swing arm device for supporting rear wheels, a rear axle case is coupled to a rear end of the swing arm, a final reduction gear for rear wheels is housed inside the rear axle case, and a wet multiple-disk braking device is housed inside the brake casing.

In order to lubricate and cool down the brake device and the final reduction gear, an oil chamber is provided in a part inside the swing arm device, which is a different part from the brake device, and the lubricant stored in the oil chamber is employed for lubricating and cooling down the brake device and the final reduction gear.

On the other hand, Japanese Laid-Open Patent Publication No. 59-130791 discloses a three-wheeled vehicle, as another piece of prior art, in which a wet multiple-disk braking device, composed of a friction plate, a separator plate, etc., is mounted between a brake center fixed to a ring gear of a differential device and an inner surface of a case of the differential device.

The friction plate of the braking device, etc. is cooled down by employing a lubricant stored inside the casing of the differential device.

In the aforementioned pieces of conventional art, the brake device is cooled down on the basis of the cooling effect by the lubricant which is commonly used in the final reduction gear, and is based upon the radiation effect (releasing effect) of the friction heat from a surface of the casing by air which is gained while the vehicle is running. However, in the conventional arts, a means or artifice to positively promote the radiation of heat from the surface of the casing is not provided.

According to the former piece of prior art, the oil chamber is mounted separately from a brake chamber and a final reduction gear chamber. Therefore, the path to allow the lubricant to circulate becomes complex.

On the other hand, according to the latter piece of prior art, inside a casing, accommodating a large bevel gear (ring gear) having a large outer diameter, of the final reduction gear, there is mounted the brake device having an outer diameter greater than the large outer diameter of the large bevel gear. Therefore, the casing of the final reduction gear becomes large, and the minimum height of the casing relative to the ground level becomes low, thus unsuitable for the straddle type four-wheeled drive vehicle. In addition, in order to increase the amount of the lubricant, it is necessary to downwardly extend a lower part of the casing of the final reduction gear. That is, the amount of the lubricant is limited by the construction.

SUMMARY OF THE INVENTION

Therefore, it is an object of the present invention to provide a brake cooling mechanism of a four-wheeled vehicle, by which it is possible to efficiently release (radiate) the frictional heat generated in the brake device from a surface of the casing.

It is another object of the present invention to provide the brake cooling mechanism which allows enough minimum height of the body of the vehicle with respect to the ground level to be secured, while realizing an enhancement of function of the aforementioned heat radiation.

In accomplishing the above and other objects, according to one aspect of the present invention, there is provided a brake cooling mechanism of a four-wheeled vehicle in which a rotation member of a drive power transmission system for rear wheels is provided with a brake device of the vehicle, comprising: a belt cover having an air discharging hole, in which the belt cover covers an automatic V-belt transmission; and an air discharging duct connected to the belt cover in a state in which the air discharging duct is communicated with the air discharging hole, and the air discharging duct has an outlet part for discharging air, wherein the air discharging duct extends up to a vicinity of the brake device so as to discharge air from the outlet part toward the brake device.

According to the mechanism, air for cooling down the brake device is supplied to the brake device by making use of air which is discharged from the automatic V-belt transmission. That is, with the mechanism, there is no need of providing a fan, or the like, for cooling the brake device exclusively, and it is possible to enhance the performance to cool down the brake device at a low cost.

In the mechanism, preferably, the air discharging duct has a rising part which is higher than the outlet part of the air discharging duct.

According to the mechanism, it is possible to prevent water and/or mud from entering the belt cover through the air discharging duct. Therefore, the mechanism is advantageous to the all-terrain vehicle which runs on a seashore, a waste land, etc.

In the mechanism, preferably, the brake device is a wet multiple-disk braking device.

According to the mechanism, the radius of a frictional plate of the brake device can be made small, and enough volume, for lubricant, of an oil sump can be secured without lowering a bottom surface of a casing, that is, enough minimum height of the body of the vehicle with respect to the ground level can be realized.

In the mechanism, preferably, the drive power transmission system for rear wheels has a final reduction gear for the rear wheels, wherein the brake device is a wet multiple-disk braking device which is mounted in front of the final reduction gear, wherein the wet multiple-disk braking device and the final reduction gear are housed inside a single casing, and wherein the single casing has an oil sump under the wet multiple-disk braking device. The terminology of the "single casing" means a common casing which is common to both of the wet multiple-disk braking device and the final reduction gear. In other words, the terminology of the same means a casing, an inner space of which is shared by both of the wet multiple-disk braking device and the final reduction gear.

In accomplishing the above objects, according to another aspect of the present invention, there is provided a brake cooling mechanism of a four-wheeled vehicle, comprising: a casing for housing a final reduction gear for rear wheels and a wet multiple-disk braking device, of the vehicle, which is mounted in front of the final reduction gear; and an oil sump which is provided in the casing under the wet multiple-disk braking device.

According to the mechanism, since the oil sump is provided in the casing under the wet multiple-disk braking device, it is possible to store a large volume of lubricant in the oil sump and to secure enough minimum height of the final reduction gear for the rear wheels with respect to the ground level. Also, according to the mechanism, because the lubricant circulates inside the casing having a large volume, a large heat radiation area (heat releasing area) is secured. Therefore, the effect to release heat generated in the casing, or the effect to cool down the casing, enhances effectively.

Furthermore, according to the mechanism, the wet multiple-disk braking device is mounted in front of the final reduction gear, and the oil sump is provided in the casing under the wet multiple-disk braking device. Therefore, the casing gets, or is hit by, air which comes from a front of the vehicle while the vehicle is running. As a result, the function to release heat is promoted.

In the mechanism, preferably, a part, for housing the wet multiple-disk braking device, of the casing has a front surface which tilts with respect to a direction of a width of the four-wheeled vehicle.

According to the mechanism, the air hitting the front surface of the casing while the vehicle is running flows readily and smoothly along the front surface of the casing, resulting in increase of effect to release (radiate) the heat.

BRIEF DESCRIPTION OF THE DRAWINGS

The above and other objects and features of the present invention will become clear from the following description taken in conjunction with the preferred embodiment thereof with reference to the accompanying drawings.

DETAILED DESCRIPTION OF THE PREFERRED EMBODIMENT

Before a description of a preferred embodiment of the present invention proceeds, it is to be noted that like or corresponding parts are designated by like reference numerals throughout the accompanying drawings.

With reference to FIGS. 1 through 5, the description is made below upon a straddle type all-terrain four-wheeled drive independent suspension vehicle to which a brake cooling mechanism according to the preferred embodiment of the present invention applies. Hereinafter, the straddle type all-terrain four-wheeled drive independent suspension vehicle is simply referred to as a "vehicle".

Layout of Four-Wheeled Drive Vehicle

Figure 1:
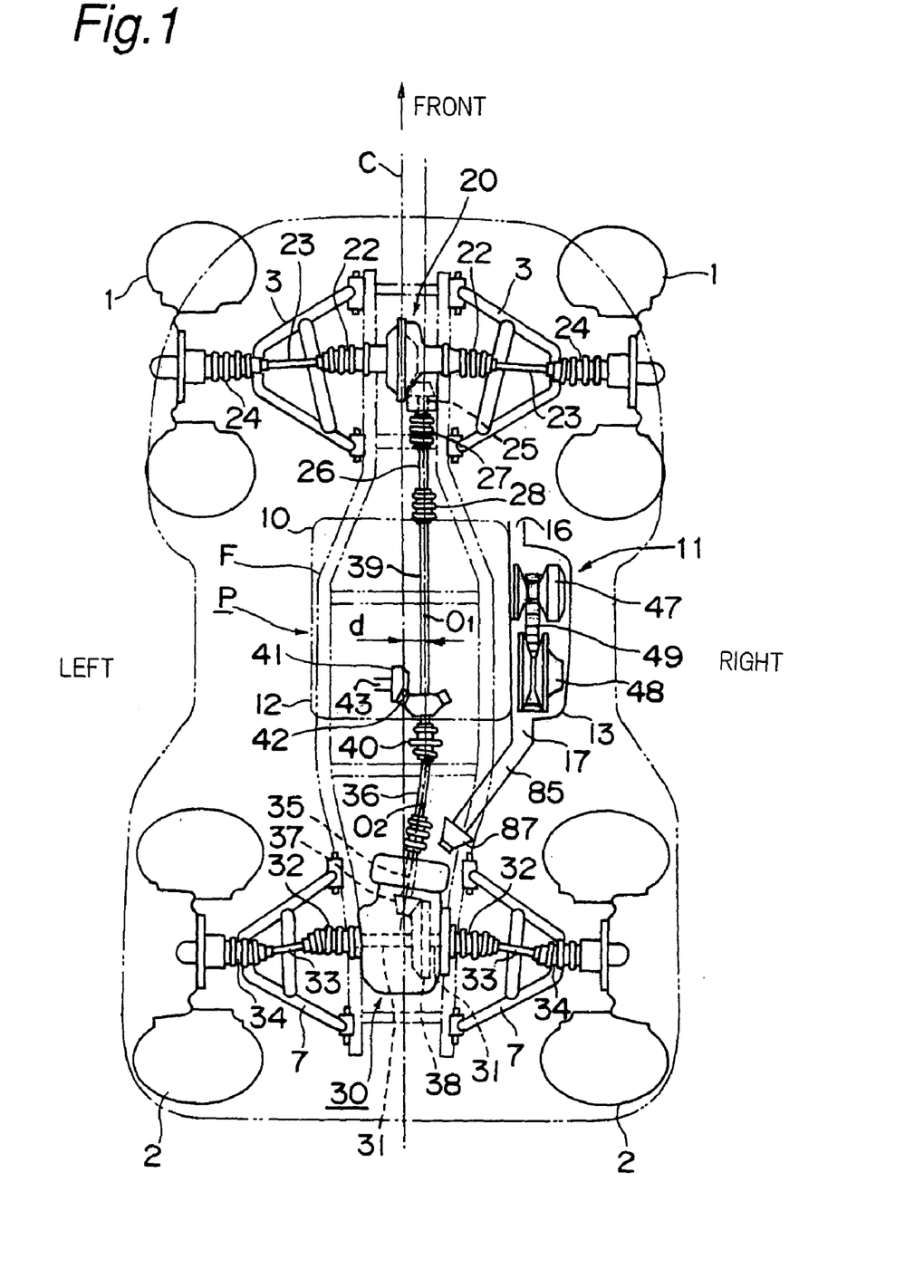
FIG. 1 is a plan view showing a four-wheeled drive vehicle in which a brake cooling mechanism according to a preferred embodiment of the present invention is mounted.
Figure 2:
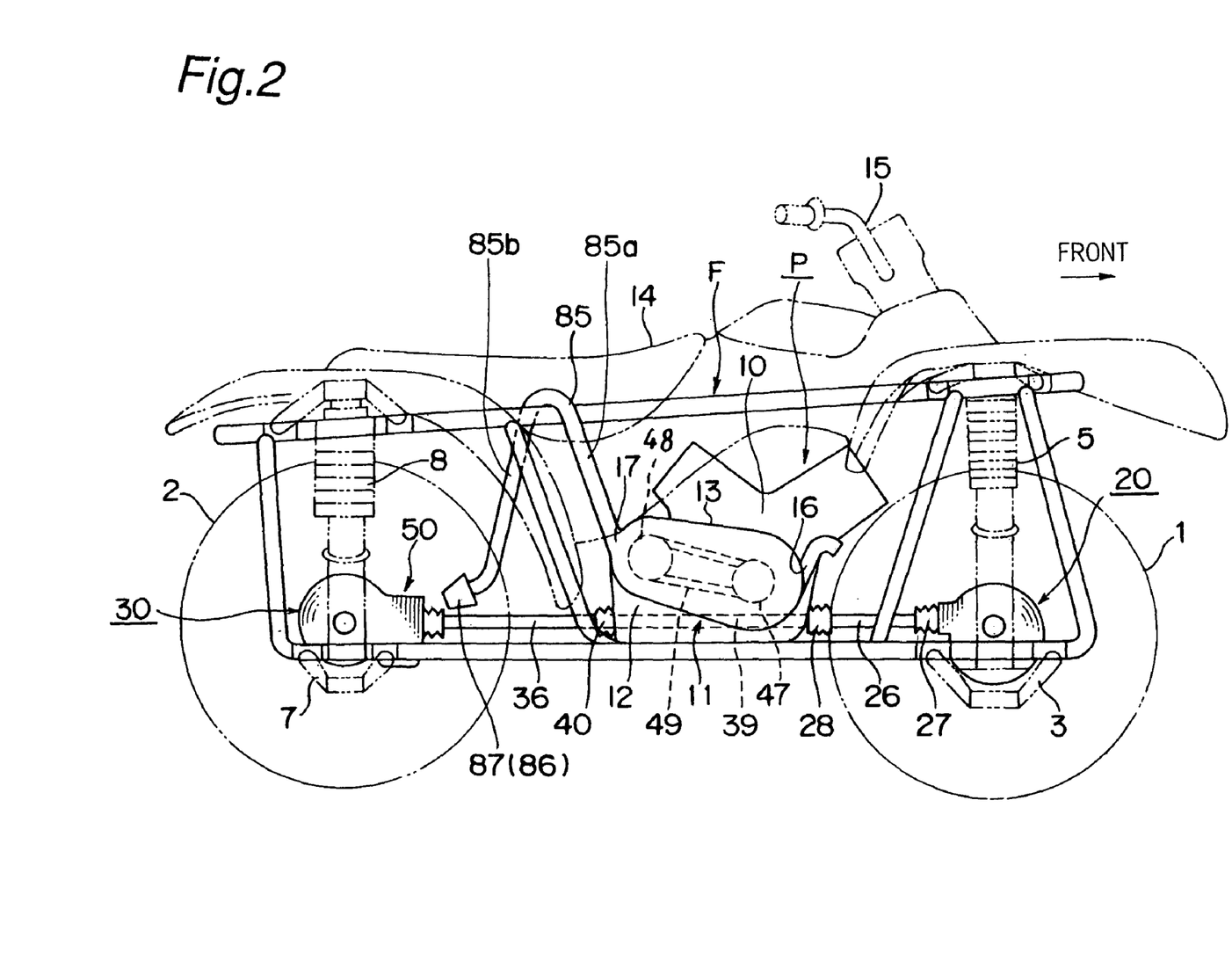
FIG. 2 is a right side view of the four-wheeled drive vehicle of FIG. 1.

FIG. 1 is a plan view showing the vehicle, and FIG. 2 is a right side view of the vehicle of FIG. 1. As shown in FIG. 2, the vehicle has a frame F which extends in a direction of front and rear of a body of the vehicle (i.e., backward and forward), left and right front wheels 1 which are mounted on the frame at a front end part of the frame F, and a suspension mechanism which supports each of the front wheels 1 so as to be able to swing up and down, independently. The suspension mechanism has a pair of front suspension arms 3, which extend on left and right sides from the frame F and which have lower and upper arms, respectively. The suspension mechanism also has a front shock absorber 5. In FIG. 2, only the lower suspension arm (or A-shaped arm) is shown.

Left and right rear wheels 2 are mounted on the frame F at a rear end part of the frame F, and a rear suspension mechanism supports each of the rear wheels 2 so as to be able to swing up and down, independently. The suspension mechanism has a pair of rear suspension arms 7 which extend on left and right sides from the frame F and have lower and upper arms, and has a rear shock absorber 8. In FIG. 2, only the lower suspension arm (or A-shaped suspension arm) is shown.

As shown in FIG. 1, between the front wheel 1 and the rear wheel 2, there are arranged a power unit P which has an engine 10, an automatic V-belt transmission 11, a gear transmission 12, and so on. The power unit P is arranged a bit forward with respect to a center between the front wheel 1 and the rear wheel 2 in the direction of front and rear of the body of the vehicle. Furthermore, as shown in FIG. 2, there are provided a straddle type seat 14 which allows a rider to straddle thereon, and a steering handle 15, both of which are mounted on an upper part of the frame F.

As shown in FIG. 1, there is provided a differential gear 20 for the front wheels 1, centrally in the direction of width of the body of the vehicle, between the left and right front wheels 1. The differential gear 20 has left and right output shafts which extend in the direction of right and left of the body of the vehicle, and each of the output shafts is connected to one end part of each of left and right front wheel drive shafts 23, through a constant velocity universal joint 22. In the arrangement, the other end part of each of the front wheel drive shafts 23 is connected to each of left and right wheel shafts of the front wheels 1, through a constant velocity universal joint 24. The right and left front wheel drive shafts 23 are constructed to have equal length and are mounted generally symmetrically with respect to a centerline C of the body of the vehicle. The centerline C is a line which crosses a center between the left and right wheels and extends in the direction of the front and rear of the vehicle. Also, the left and right front suspension arms 3 are constructed to have equal length to each other and are mounted generally symmetrically with respect to the centerline C.

The differential gear 20 for the front wheels 1 has an input shaft 25 which is mounted in a position that is offset rightward relative to the centerline C, by a distance of "d" (i.e., the input shaft 25 is arranged on a horizontal axis O1 in FIG. 1), in which the input shaft 25 is positioned in parallel with the centerline C.

On the other hand, there is provided a final reduction gear 30 for the rear wheels 2, centrally in the direction of width of the body of the vehicle, between the left and right rear wheels 2. The final reduction gear 30 has left and right output shafts 31 which extend in the direction of right and left of the vehicle, each of the output shafts 31 is connected to one end part of each of left and right rear wheel drive shafts 33, through a constant velocity universal joint 32, and the other end part of each of the rear wheel drive shafts 33 is connected to each of rear wheel shafts of the rear wheels 2, through a constant velocity universal joint 34. The left and right rear wheel drive shafts 33 are constructed to have equal length to each other and are mounted generally symmetrically with respect to the centerline C. Also, the left and right rear suspension arms 7 are constructed to have equal length to each other and are mounted generally symmetrically with respect to the centerline C.

The final reduction gear 30 for the rear wheels 2 has an input shaft 35 having a front part and a rear part. The input shaft 35 is provided with a small bevel gear (pinion gear) 37 which is fixed to the rear part thereof, and the bevel gear 37 is located generally at a central part relative to the direction of the width of the body of the vehicle (i.e., located generally on the centerline C). On the other hand, the input shaft 35 tilts rightwards from the rear part towards the front part with respect to the centerline C.

Automatic V-belt Transmission

There is arranged the automatic V-belt transmission 11 on a right side of the engine. The automatic V-belt transmission 11 has a drive pulley 47 which is coupled to a crankshaft, extended sideways, of the engine 10, a driven pulley 48 which is coupled to an input shaft of the gear transmission, and a V-belt 49 which extends between the drive pulley 47 and the driven pulley 48. The automatic V-belt transmission 11 operates in such a manner that a reduction ratio thereof changes automatically from a state of maximum reduction ratio upon starting the operation to a state of a low reduction ratio according to an increase of the engine speed, or in such a manner that the reduction ratio increases automatically, as the load from the side of the wheels 1 and 2 increases.

The automatic V-belt transmission 11 is covered by a belt cover 13 which has an air inlet hole 16 for cooling at its front part, and which has an air outlet hole 17 at its rear part. In the construction, outside air is taken in the air inlet hole 16 by an air sucking fan which is arranged on a rear side of the drive pulley 47, the air cools down the automatic V-belt transmission 11, and the air is discharged from the air outlet hole 17.

Drive Power Transmission System for Transmitting Drive Power from Power Unit to Differential Gear for Front Wheel and to Final Reduction Gear for Rear Wheel A power takeoff shaft 39 of the power P unit is provided in a lower portion of the power unit P so as to extend backward and forward (i.e., in the direction of the front and rear of the vehicle) in parallel with the centerline C. The power takeoff shaft 39 is mounted on a right side of the centerline C, and it is located on the axis 01 which corresponds to the axis O1 of the input shaft 25 of the differential gear 20. The power takeoff shaft 39 is interlocked to an output shaft 43 of the gear transmission 12 through small and large bevel gears 41 and 42.

A front part of the power takeoff shaft 39 projects forwards from a front edge of the power unit P (i.e., front edge of the engine 10). A rear part of the input shaft 25 of the differential gear for the front wheels 1 and the front part of the power takeoff shaft 39 are connected to each other, with a front propeller shaft 26. The front propeller shaft 26 locates on the axis 01 which is coaxial with each of the input shaft 25 and the power takeoff shaft 39.

In the construction, a connection part between a front part of the front propeller shaft 26 and the input shaft 25, and a connection part between a rear part of the front propeller shaft 26 and the power takeoff shaft 39, are arranged on the same axis 01 as the axis of the three shafts 25, 26 and 39. Therefore, the connection parts are not composed of universal joints, but are composed of coaxial spline couplings 27, 28 which are simple in constitution.

Figure 3:
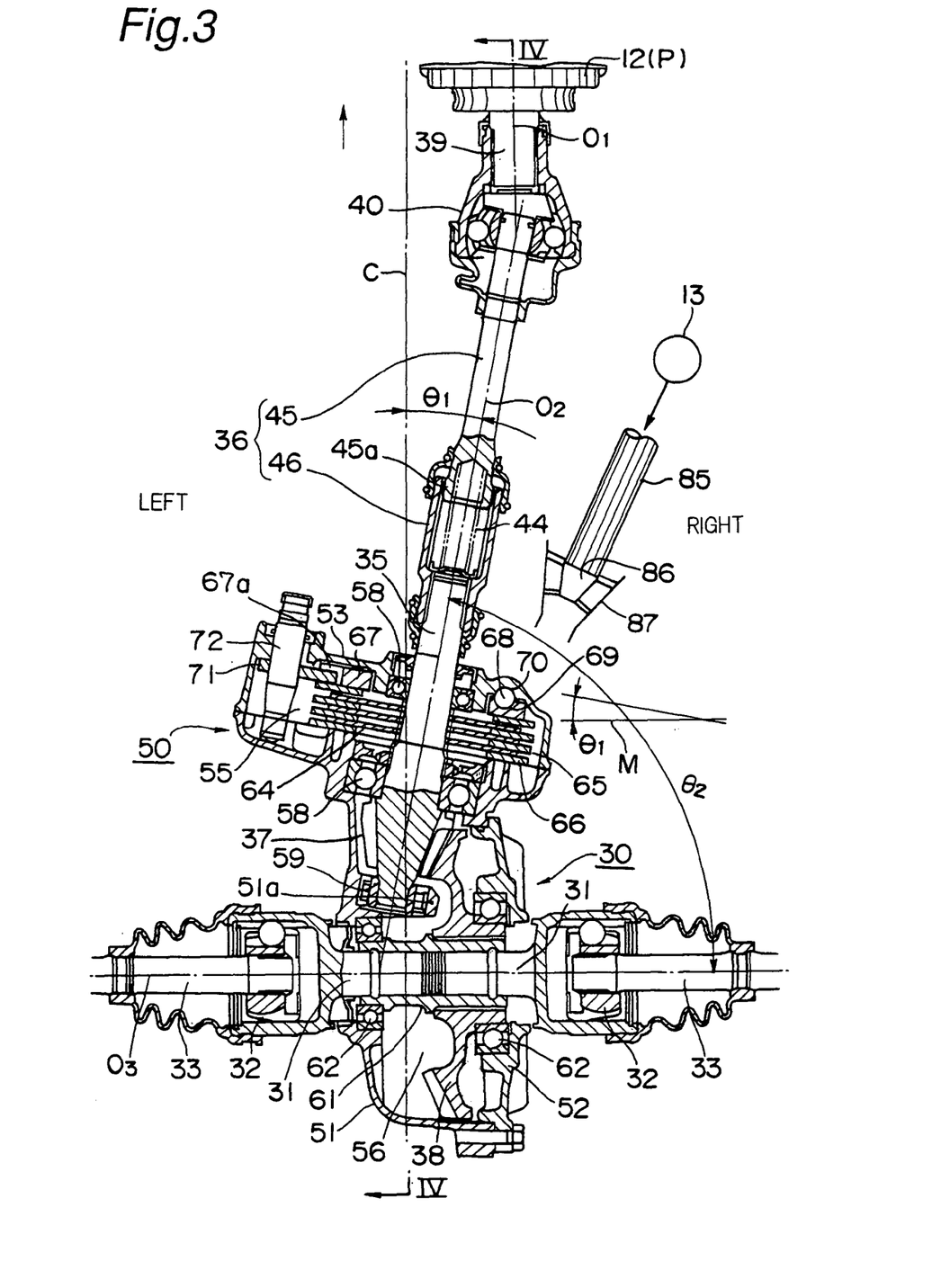
FIG. 3 is an enlarged view of a horizontal cross section showing a final reduction gear for a pair of rear wheels and a wet multiple-disk braking device which are employed for the four-wheeled drive vehicle of FIG. 1.

FIG. 3 is an enlarged view of a horizontal cross section showing the power transmission mechanism for driving the rear wheels 2. As shown in the figure, a rear part of the power takeoff shaft 39 projects rearwards from a rear edge of the power unit P (a rear edge of the gear transmission 12). The rear part of the power takeoff shaft 39 is coupled to the tilted input shaft 35 of the final reduction gear 30, via a rear propeller shaft 36 for the rear wheels 2. As shown therein, the rear propeller shaft 36 tilts relative to the centerline C so as to be coaxial with the tilted input shaft 35.

The distance between a rear part of the power takeoff shaft 39 and the final reduction gear 30 in the direction of the front and rear of the vehicle is set to be longer than the distance between the front part of the power takeoff shaft 39 and the differential gear 20 (refer to FIG. 1). To be precise, the distance between a rear end of the power takeoff shaft 39 and a front end of the input shaft 35 of the final reduction gear 30 is set to be longer than the distance between a front end of the power takeoff shaft 39 and a rear end of the input shaft 25 of the differential gear 20 so that the rear propeller shaft 36 is longer than the front propeller shaft 26.

As aforementioned, the input shaft 35 of the final reduction gear 30 has the small bevel gear 37 which is positioned generally centrally with respect to the width of the body of the vehicle (i.e., generally on the centerline C), and the front part of the input shaft 35 tilts on the right hand side towards the front of the vehicle, with respect to the centerline C. In the embodiment, the angle θ1 of inclination of the input shaft 35 relative to the centerline C, is set to be 11 degrees, for example. In other words, the input shaft 35 inclines at an angle of 79 degrees (i.e., θ2=79 degrees), with respect to an axis 03 of a hollow shaft 61 for the rear wheels 2 to which the large bevel gear 38 is mounted.

The propeller shaft 36 tilts rightwards towards the front of the vehicle at the same angle θ1 as that of the input shaft 35 with respect to the centerline C, and the rear propeller shaft 36 is positioned on the same axis 02 which is the axis of the input shaft 35. The propeller shaft 36 has an intermediate shaft 45 which constitutes a front part of the propeller shaft 36 and has a hollow shaft 46 which constitutes a rear part thereof.

A front part of the intermediate shaft 45 is coupled to the rear part of the power takeoff shaft 39, through a constant velocity universal joint 40. The rear part of the intermediate shaft 45 has an outer spherical spline 45a, with which an inner spline formed on a front part of the hollow shaft 46 engages so as to able to move in the direction of the axis of the propeller shaft 36. With the construction, the propeller shaft 36, as a whole, can expand and contract in the direction of the axis O2, and at the same time a slight bending thereof can be absorbed in the spherical spline 45a.

The hollow shaft 46 has an inner spline in a rear end part, which engages with an outer spline of the input shaft 35. Between the intermediate shaft 45 and the hollow shaft 46, there is mounted a compressed coil spring 44, the biasing force of which all the time acts in the direction of keeping both of the shafts 45 and 46 apart from each other. The biasing force exerted by the coil spring 44 prevents any play in the direction of the axis O2 from occurring inside the propeller shaft 36. Also, with the coil spring 44 and its operation, it is possible to mount the propeller shaft 36 without removing the final reduction gear 30 from the frame F.

Final Reduction Gear for Rear Wheel and Brake Device

As shown in FIG. 3, the final reduction gear 30 for the rear wheels 2, has the small bevel gear 37 and the large bevel gear 38 which meshes with the small bevel gear 37, as aforementioned. There is arranged a wet multiple-disk braking device 50 for the input shaft 35 which inclines rightwards forwards, also as aforementioned. A casing for the final reduction gear 30 and a casing for the braking device 50, are formed integrally to each other. The integrally formed casing has a housing 51 which surrounds both of the bevel gears 37 and 38, a right side cover 52 of the housing 51, and a brake cover 53 which is detachably attached to a front end part of the housing 51. That is, the housing 51, the right side cover 52, and the brake cover 53 are integrally coupled to form a single case (or a single casing) for housing the final reduction gear 30 and the wet multiple-disk braking device 50.

The input shaft 35 is rotatably supported by the brake cover 52 and the housing 51, through front and rear bearings 58 which are mounted inside a brake chamber 55. The small bevel gear 37 projects inside a speed reduction gear chamber 56, and its rear end part is supported by a boss part 51a formed in the housing 51, through a bearing 59. That is, the small bevel gear 37 is supported thereby at locations of the front and rear end parts thereof.

The large bevel gear 38 is positioned on the right side of the small bevel gear 37, and it is fixed (or screwed) to an outer surface of the hollow shaft 61 which extends in the direction of the right and left of the vehicle, with respect to the centerline C. The large bevel gear 38 and the hollow shaft 61 are rotatably supported by the housing 51 and the right side cover 52 through bearings 62 which are arranged on the right and left sides of the large bevel gear 38. The hollow shaft 61 has an inner spline which engages with left and right output shafts 31 for the rear wheels 2. Each of the output shafts 31 projects from the housing 51 and the right side cover 52, in the direction of the right and left of the vehicle, respectively. Each of the outputs shafts 31 and 31 is connected to each of the drive shafts 33 and 33 for the rear wheels 2, through each of the constant velocity universal joints 32 and 32.

As aforementioned, the input shaft 35 of the final reduction gear 30, tilts rightwards forwards at the angle of θ1 (θ=11°) with respect to the centerline C. In compliance with this construction, the front and rear side surface walls of the braking device 50 are so formed that the angle of θ1 (θ=11°) forms between each of the front and rear side surface walls thereof and a plane (or surface) perpendicular to the centerline C, in the same direction as that of the input shaft 35.

The wet multiple-disk braking device 50 has a plurality of friction plates 64 which engage with an outer spline of the input shaft 35 so as to be able to move in the direction of the axis of the input shaft 35, a plurality of separators 66, which are mounted alternately with respect to the friction plates 64 in the direction of the axis, in which the separate plates 66 engage with an inner groove part 65 formed on an inner wall of the brake cover 53, movably in the direction of the axis, an annular pressure plate 67 which is mounted between the separate plate 66 at the front and a rear surface of the brake cover 53, a steel ball 68 of a cam mechanism for a braking operation, and so on.

The pressure plate 67 is rotatably supported by a boss part formed inside the brake cover 53. The pressure plate 67 has a plurality of wedge grooves 69 which are formed circumferentially at equal intervals on its front edge surface. Each of the wedge grooves 69 is formed so as to extend in a shape of an arc in the direction of circumference of the pressure plate 67, and is formed so that a depth becomes shallows in one direction of the circumference. The steel balls 68 which are mounted inside concave parts 70 formed on the rear surface of the brake cover 53, engage with the wedge grooves 69, respectively, forming the cam mechanism for braking operation.

The pressure plate 67 has a projection 67a on its outer surface, and the projection 67a engages with a brake operation lever 71 which is fixed to a lever shaft 72. The lever shaft 72 is rotatably supported by the brake cover 53 and the housing 51, and the lever shaft 72 projects forwards from the brake cover 53. The lever shaft 72 is interlocked with an unshown brake operation part, such as a brake operation pedal, a brake operation lever, and so on, via an operational force transmission mechanism, such as a wire transmission mechanism.

Namely, when the brake operation part is operated, and when the lever shaft 72 and the brake operation lever 71 are rotated, the pressure plate 67 is also rotated, from a state shown in FIG. 3, with the projection 67a. Then, the pressure plate 67 moves backwards on the basis of the cam action between the steel ball 68 and the wedge groove 69. At this time, all of the friction plates 64 and all of the separate plates 66, are pinched, under a pressure, between the pressure plate 67 and the front surface wall of the housing 51, so that the input shaft 35 is braked thereby.

Cooling of Brake and Lubricant Device

In the embodiment, as a device for cooling the wet multiple-disk braking device 50, a lubricant circulation system in which the lubricant housed in the final reduction gear chamber 56 and in the brake chamber 55 is circulated, is employed. Furthermore, in order to promote the heat radiation from the lubricant at a high temperature, the power transmission mechanism adopts a construction, by which a wind gained while the vehicle is running, and an air discharged from the automatic V-belt transmission, are used positively.

Figure 4:
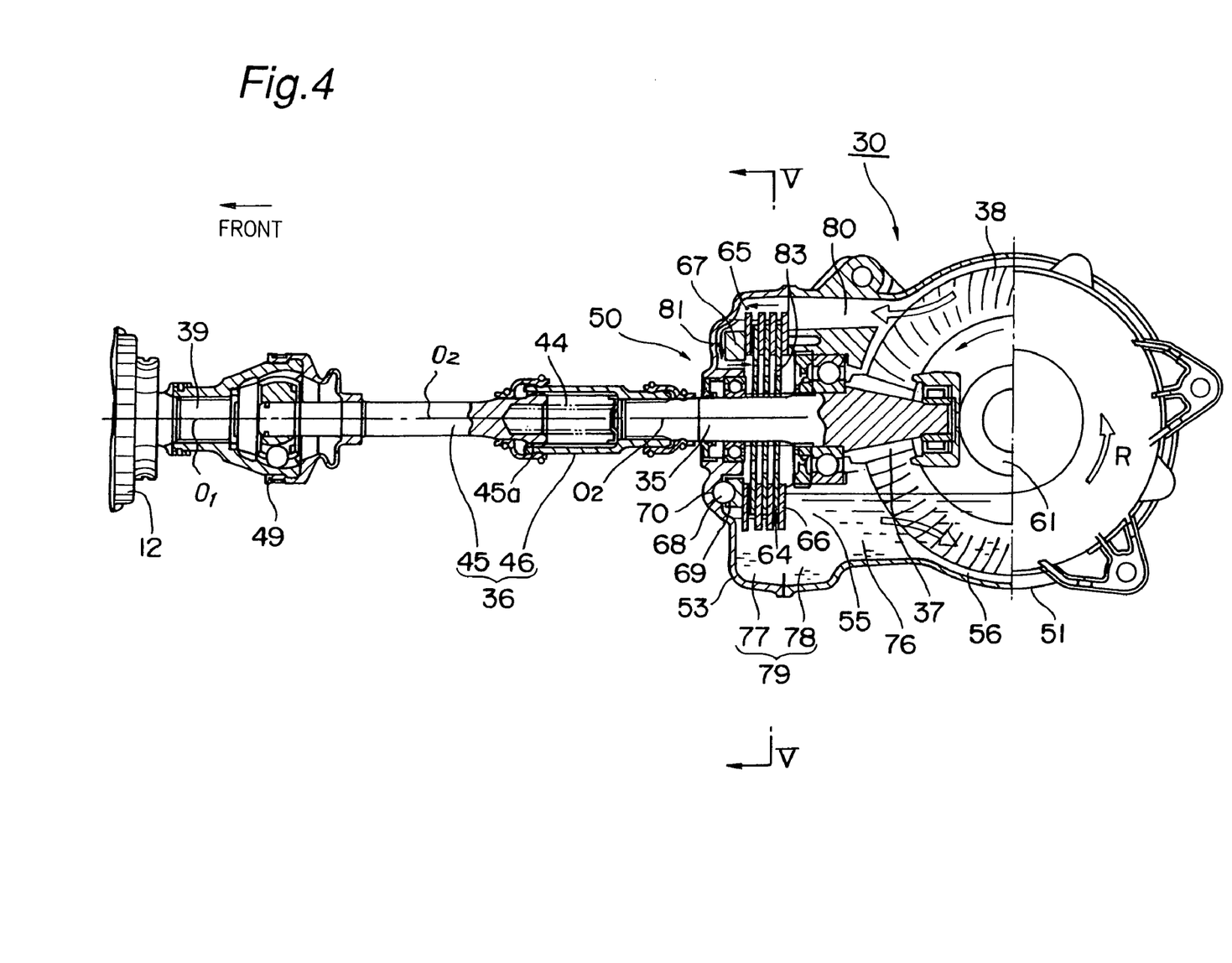
FIG. 4 is a cross sectional view taken approximately on a line corresponding with IV—IV in FIG. 3.

FIG. 4 is an enlarged view of a horizontal cross section generally taken on a line of IV—IV of FIG. 3, and the figure shows the final reduction gear 30 and the wet multiple-disk braking device 50. As shown in the figure, each of the friction plates 64 and separate plates 66, has an outer diameter which is smaller than the outer diameter of the large bevel gear 38. The brake cover 53 and the housing 51, have concave parts 77 and 78, at the bottom part, which extend in the direction of the width of the body of the vehicle (refer to FIG. 5). The concave parts 77 and 78 form an oil sump 79 having a large volume, for the lubricant, in a bottom part of the brake chamber 55. The oil sump 79 fluidically communicates with (or is connected to) a lower part of the final reduction gear chamber 56, via a lower oil passage 76.

On the other hand, the housing 51 has a rear part which is formed as a circular arc so as to surround an outer circumference of the large bevel gear 38 with a small gap therebetween, as shown in FIG. 4, to ensure a high ground clearance. Also, an upper inside of a front part of the housing 51, has an oil passage 80 which fluidically communicates with an upper inside of the final reduction gear chamber 56 and the upper inner circumferential groove part 65 of the brake chamber 55.

Also, there is provided an oil passage 81 which is formed between a front surface of the pressure plate 67 and the rear surface of the front edge brake cover 53, in which the oil passage 81 communicates with a space inside the plurality of separate plates 66. A radially inwardly circumferential part of each of the friction plates 64, has a plurality of oil passage openings 83.

Figure 5:
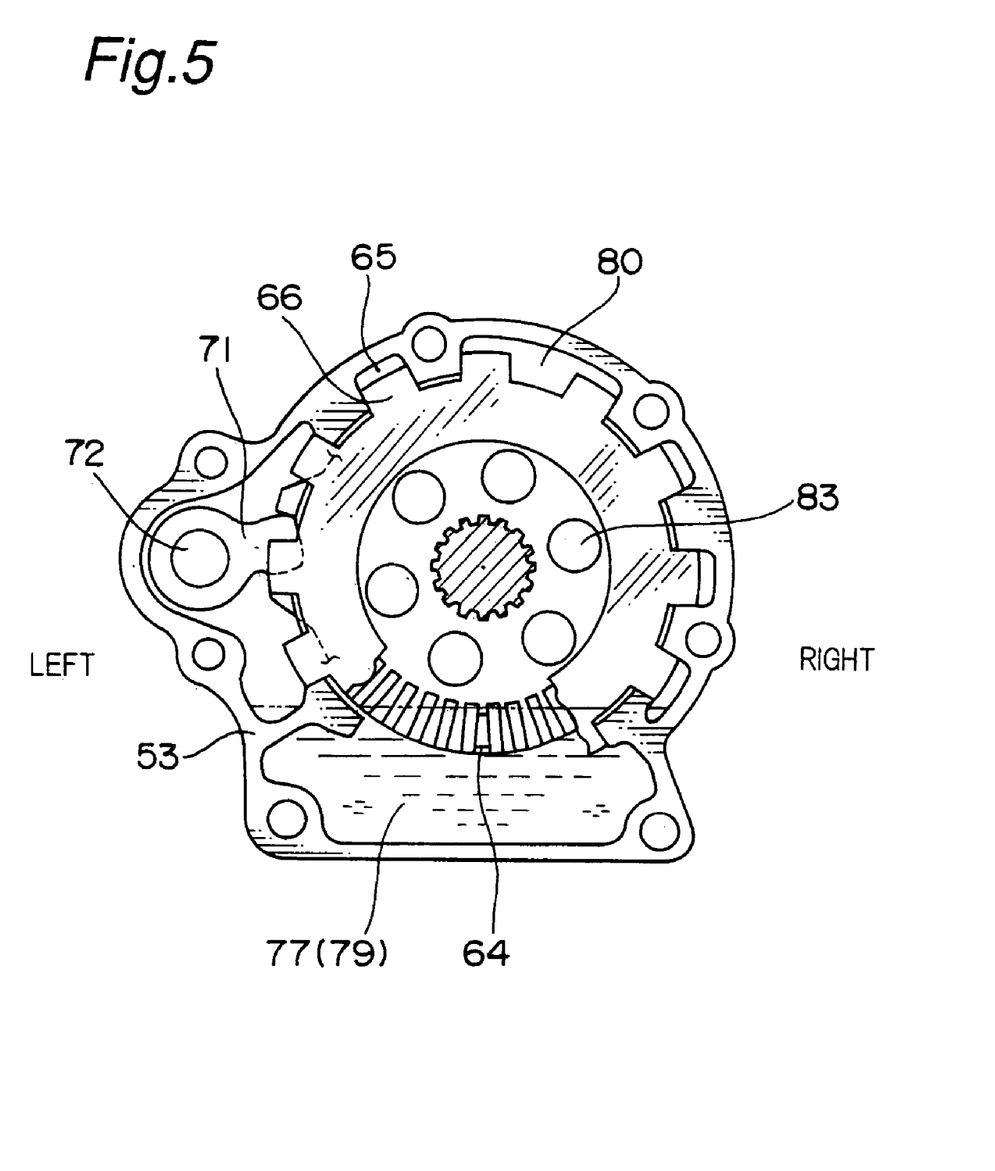
FIG. 5 is a cross sectional view taken approximately on a line corresponding with V—V in FIG. 4.

FIG. 5 is a cross sectional view taken approximately on a line corresponding with V—V in FIG. 4. As shown in the figure, the oil passage openings 83 are formed so as to penetrate the friction plate 64 in the direction of circumference at equal intervals. Meanwhile, the oil sump 79 is formed larger in the direction of the width of the vehicle than in the direction of the centerline C of the vehicle, in which the oil sump 79 is secured to have a large volume for storing the lubricant, as explained above.

Brake Cooling Mechanism Making Use of Air Discharged from Automatic V-belt Transmission In FIG. 2, the air outlet hole 17 provided at the rear end of the belt cover 13 is connected to an air discharging guide 85. As shown in the figure, the air discharging guide 85 extends rearwards so as to ascend once to form an ascending part 85a, enters a space between the frame F, descends to form a descending part 85b, and extends up to a vicinity of the front portion of the brake cover 53 of the wet multiple-disk braking device 50 (refer to FIG. 3).

As shown in FIG. 3, a rear part of the air discharging guide (pipe) 85 extends diagonally leftward towards the rear of the vehicle, and a rear end part thereof is orientated and opened towards the brake cover 53. The rear end part of the air discharging guide 85 has a choke part 86 in order to increase the air discharging flow rate. Furthermore, there is provided a mixer tube 87 around the choke part 86, with a gap, or space, being formed radially circumferentially therebetween. The mixer tube 87 has a tapered shape, the radius of which decreases towards the rear of the vehicle body. Namely, the construction thereof forms an air ejector. Thereby, the amount of air is increased, and the temperature of the air is decreased to cool the braking device 50, effectively.

Transmission of Drive Power for Moving Vehicle

In FIG. 1, the drive power which is outputted from the crankshaft of the engine 10, is transmitted to the gear transmission 12 through the automatic V-belt transmission 11, and then the drive power is transmitted to the power takeoff shaft 39 from the output shaft 43 of the gear transmission 12 through the bevel gears 42 and 43.

The drive power is transmitted from the front part of the power takeoff shaft 39 to the front propeller shaft 26 for the front wheels 1 through the spline coupling 28. On the other hand, the drive power is transmitted from the rear part of the power takeoff shaft 39 to the rear propeller shaft 36 for the rear wheels 2 through a constant velocity universal coupling 40.

The drive power which is transmitted to the front propeller shaft 26, is reduced in rotational speed inside the differential gear 20. The drive power is, then, transmitted to both of the constant velocity universal joints 22, to both of the front wheel drive shafts 23, to both of the constant velocity universal joints 24, and to both of the front wheels 1.

Referring to FIG. 3, the drive power which is transmitted to the rear propeller shaft 36 in a posture of inclination as explained above, is transmitted to the input shaft 35 of the final reduction gear 30, through the spline coupling. Then, the drive power is changed in direction by the small bevel gear 37 and the large bevel gear 38, while the drive power is reduced in rotational speed, the drive power is transmitted to both of the output shafts 31 through the hollow shaft 61, and then the drive power is transmitted to both of the drive shafts 33 through both of the constant velocity universal couplings 32.

Cooling of Brake

In FIG. 4, the lubricant contained in the oil sump 79 on the bottom part of the wet multiple-disk wet braking device 50, is forced to be flowed upwards in the direction shown by an arrow "R" on the basis of rotation of the large bevel gear 38. The lubricant is then moved into the inner circumferential groove part 65 locating in the front part of the final reduction gear 30, through the oil passage 80 located at the upside of the final reduction gear chamber 56, thus cooling down the radially outer circumferential part of the separation plates 66. Subsequently, the lubricant passes through the oil passage 81 locating forward of the pressure plate 67, to cool down the pressure plates 67. At the same time, the lubricant enters the radially inner circumferential part of the separation plates 66. Then, the lubricant cools down the friction plates 64 while passing through the oil passage openings 83 thereof, and then the lubricant returns back to the oil sump 79.

In this way, the lubricant circulates through the whole space of the final reduction gear chamber 56 and the brake chamber 55. Therefore, with the construction, a large radiation area for releasing any heat generated in the final reduction gear 30 and the wet multiple-disk braking device 50 is surely secured, and the cooling of the braking device 50 is enhanced thereby. Also, according to the construction, the oil sump 79 is positioned in the brake chamber 55 which is located in front of the final reduction gear 30. Therefore, the lubricant stored in the brake chamber 55, and the lubricant stored in the oil sump 79, are effectively cooled down by the air, or wind, blown from front while the vehicle is running.

Furthermore, with reference to FIGS. 1 to 3, the air discharged from the belt cover 13 is discharged through the air discharging guide (or pipe) 85 and the mixer tube 87 towards the front edge brake cover 53 with the outside air sucked by the mixer tube 87. Therefore, the heat radiation effect (or heat liberation effect) is further promoted.

Furthermore, as aforementioned, the brake cover 53 tilts with respect to the surface (or plane) M which is perpendicular to the centerline C of the vehicle. Therefore, the air blown from front of the vehicle during its running, flows smoothly along the front surface of the brake cover 53 from the left to the right thereof, so that the heat radiation effect is further enhanced.

As aforementioned, the air discharging guide 85 has a vertically ascending (or rising) part, as shown in FIG. 2, between the air outlet hole 17 of the belt cover 13 and the choke part 86. Therefore, with the construction, water is effectively prevented from entering the belt cover 13 from the choke part 86, through the air discharging guide 85.

Although the present invention has been fully described in connection with the preferred embodiment thereof with reference to the accompanying drawings, it is to be noted that various other changes and modifications are also apparent to those skilled in the art.

For example, the power transmission mechanism according to the present invention, is not limited to the application to the all-terrain four-wheeled drive vehicle, and the same mechanism according thereto can apply to other types of four-wheeled drive vehicles.

Also, the power transmission mechanism according to the present invention can apply to a four-wheeled drive vehicle which has a mechanism for switching a two-wheel drive and a four-wheeled drive.

Such changes and modifications are also to be understood as included within the scope of the present invention as defined by the appended claims unless they depart therefrom.

What is claimed is:

1. A power unit for rear wheels of a four-wheeled vehicle, the power unit comprising:
- a gear transmission for the rear wheels;
- an automatic V-belt transmission for providing power from an engine to the gear transmission;
- a final reduction gear having an input shaft connected to the gear transmission via a propeller shaft;
- a brake device for the rear wheels mounted to the input shaft of the final reduction gear;
- a belt cover having an air inlet hole and an air discharging hole covering the automatic V-belt transmission, the air inlet hole for receiving air to cool the automatic V-belt transmission and the air discharging hole for outputting the air from the belt cover; and
- an air discharging duct connected to the belt cover such that the air discharging duct communicates with the air discharging hole, the air discharging duct having an outlet part for discharging air,
- wherein the air discharging duct extends to a vicinity of the brake device so as to discharge air from the outlet part toward the brake device.

2. The power unit as claimed in claim 1, wherein the brake device is a wet multiple-disk braking device.

3. The power unit as claimed in claim 2,
- wherein an entirety of the wet multiple-disk braking device is mounted in front of the final reduction gear in a direction of movement of the four-wheeled vehicle,
- wherein the wet multiple-disk braking device and the final reduction gear are housed inside a single casing, and
- wherein the single casing has an oil sump under the wet multiple-disk braking device.

4. The power unit as claimed in claim 3, wherein the outlet part of the air discharging duct is provided opposite a front surface of the single casing inside which the wet multiple-disk braking device and the final reduction gear are housed.

5. A brake cooling mechanism of a four-wheeled vehicle, the brake cooling mechanism comprising:
- a casing for housing a final reduction gear for rear wheels and a wet multiple-disk braking device, the wet multiple-disk braking device being mounted in front of the final reduction gear in a direction of forward movement of the four-wheeled vehicle; and
- an oil sump which is provided in the casing under the wet multiple-disk braking device, wherein a part of the casing which houses the wet multiple-disk braking device has a front surface that is tilted with respect to a direction of width of the four-wheeled vehicle; and
- wherein the front surface of the part of the casing forms a front surface of the oil sump.

* * * * *